(12) United States Patent
Budd et al.

(10) Patent No.: US 7,883,277 B2
(45) Date of Patent: Feb. 8, 2011

(54) INTERCONNECTING (MAPPING) A TWO-DIMENSIONAL OPTOELECTRONIC (OE) DEVICE ARRAY TO A ONE-DIMENSIONAL WAVEGUIDE ARRAY

(75) Inventors: Russell A. Budd, North Salem, NY (US); Punit P. Chiniwalla, New York, NY (US); John A. Guckenberger, Carlsbad, CA (US); Jeffrey A. Kash, Pleasantville, NY (US); Jeremy D. Schaub, Austin, TX (US); Michael Tan, Menlo Park, CA (US); Jeannine M. Trewhella, Peekskill, NY (US); Garry Trott, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/117,803

(22) Filed: May 9, 2008

(65) Prior Publication Data

US 2008/0205817 A1  Aug. 28, 2008

Related U.S. Application Data

(63) Continuation of application No. 11/374,777, filed on Mar. 14, 2006, now Pat. No. 7,474,815.

(51) Int. Cl.
*G02B 6/36* (2006.01)
*G02B 6/255* (2006.01)

(52) U.S. Cl. .............................. 385/89; 385/92; 385/93; 385/94

(58) Field of Classification Search .................. 349/14, 349/31, 39, 88, 129; 385/14, 31, 39, 88, 385/47, 49, 89, 15, 129–132, 92–94, 52
See application file for complete search history.

(56) References Cited

U.S. PATENT DOCUMENTS

| 5,543,830 | A | 8/1996 | Lea |
| 5,995,475 | A | 11/1999 | Gelbart |
| 6,931,195 | B2 * | 8/2005 | Lemoff ....................... 385/137 |
| 2003/0002770 | A1 | 1/2003 | Chakravorty et al. |
| 2004/0120658 | A1 * | 6/2004 | McFarland et al. ............ 385/89 |

FOREIGN PATENT DOCUMENTS

EP  0 544 002 A1  5/2002

OTHER PUBLICATIONS

P. Schnitzer, et al., "High Performance VCSEL Arrays for Optical Interconnection", 1998 Electronic Components and Technology Conference (1998 IEEE), pp. 762-770.

* cited by examiner

*Primary Examiner*—Charlie Peng
*Assistant Examiner*—Mary A El Shammaa
(74) *Attorney, Agent, or Firm*—Scully, Scott, Murphy & Presser, P.C.; Daniel Morris, Esq.

(57) ABSTRACT

For integrated circuits including circuit packaging and circuit communication technologies provision is made for a method of interconnecting or mapping a two-dimensional optoelectronic (OE) device array to a one-dimensional waveguide array. Also provided is an arrangement for the interconnecting or mapping of a two-dimensional optoelectronic (OE) device array to a one-dimensional waveguide array.

32 Claims, 4 Drawing Sheets

INTERCONNECTING (MAPPING) A TWO-DIMENSIONAL OPTOELECTRONIC (OE) DEVICE ARRAY TO A ONE-DIMENSIONAL WAVEGUIDE ARRAY

CROSS-REFERENCE TO RELATED APPLICATION

This application is a continuation application of U.S. Ser. No. 11/374,777; filed Mar. 14, 2006 now U.S. Pat. No. 7,474,815

STATEMENT AS TO RIGHTS TO INVENTION MADE UNDER FEDERALLY SPONSORED RESEARCH AND DEVELOPMENT

The United States may have rights to certain inventions disclosed herein under DARPA Contract MDA972-2-03-004.

BACKGROUND OF THE INVENTION

1. Field of the Invention

The present invention relates to integrated circuits including circuit packaging and circuit communication technologies and, in particular, relates to the provision of a method of interconnecting or mapping a two-dimensional optoelectronic (OE) device array to a one-dimensional waveguide array. Furthermore, the present invention also pertains to an arrangement for the interconnecting or mapping of a two-dimensional optoelectronic (OE) device array to a one-dimensional waveguide array, utilizing the method pursuant to the invention.

Presently utilized high-end computer systems are limited in their outputs or operational performances to a certain lesser extent by the clock speeds of microprocessors than they are by the interconnections, which are provided between the microprocessors. Consequently, in view of increases in the throughput of data rates, which are encountered in present computer systems, traditionally employed cooper links or connections which are thus restricted to shorter distances, especially in the presence of power constraints and high aggregate bandwidths. Accordingly, for board-to-board and rack-to-rack interconnects, the overall throughput of data is beginning to be limited due to the increasing density of edge connectors. The incorporation of highly-parallel optical data links into these high-end computer systems is deemed to offer a superior degree of performance with regard to the intent of obtaining greater connector densities, with a concomitant reduction in power dissipation and resulting in reduced production and operation expenditures.

In essence, parallel optical modules are constituted of arrays of silicon circuitry, which are connected to optoelectronic (OE) devices and implemented with the employment of III-V semiconductors.

A circuit packaging option, which is particularly attractive in the implementation thereof resides in connecting two substrates utilizing flip-chip technology. This, in essence, necessitates that the optoelectronic (OE) device is constrained to operate at a wavelength at which the OE substrate is transparent, whereby the projected optical beam is emitted or detected through the substrate. In that instance, the light can be readily coupled to polymer-based waveguides, which are easily routed across the circuit board to other optical modules, and wherein the waveguides, in an alternative construction, can also be embedded in the circuit board.

Moreover, it is also possible to employ the presently known more traditional configurations in which the silicon chip is connected to the circuit board utilizing a ball grid array (BOA) and the OF device is connected to the silicon chip through the intermediary of wirebonds. The OE device emits or detects light in an upward direction from the top surface, and whereby the waveguide is mounted above the OE chip, which supports the OE device.

Inasmuch as the waveguides are lithographically defined, the physical density between adjacent of the linear channels can be extremely high, for example, such as at an about 62.5 μm pitch. However, in that instance, it is physically impractical to lay out the channels in the optical module at this narrow pitch, in view of the space which is required in order to be able to implement the placements of the OE devices and the silicon circuitry, and provide space for lens coupling elements, as a result of which, currently a practical pitch for these channels is deemed to be about 250 μm. The waveguides can, accordingly, be fanned out to the wider module pitch. However, as the number of optical channels employed increases, this approach is encumbered with a number of drawbacks in the implementation thereof. In particular, as the linear dimension increases, the optical alignment between the modules and the waveguides becomes increasingly difficult to maintain due to excessive run out. Moreover, a timing skew, which is encountered between channels at the edge of the array and those optical channels, located proximate to or in the center becomes extremely large and disconant in its dimensions.

An alternative approach in an attempt to obviate the encountered drawbacks would be to fabricate the electro optical device channels on a rectangular 2D (two-dimensional) array, whereby this arrangement produces a more compact optical module, providing for an easier optical alignment between the waveguide and the channels and a reduced timing skew between the channels. However, this approach is somewhat disadvantageous in that the optical waveguides must be routed around relatively sharp bends, and in most instances, polymer waveguides are subjected to substantial losses at bend radii which are less than 5 mm.

The current state of the technology does not disclose the particular novel aspects of interconnecting or mapping a two-dimensional OE device array to a one-dimensional waveguide array analogous to that set forth by the present invention.

2. Discussion of the Prior Art

Lea, U.S. Pat. No. 5,543,830, discloses an apparatus with a light emitting element, microlens and gradient index lens characteristics for imaging continuous tone images. In that instance, there is no disclosure of any interconnecting or mapping of a two-dimensional OE device array to a one-dimensional waveguide array analogous to the present invention.

Similarly, Chakravorty, et al., U.S. Patent Publication No. 2003/0002770 A1 fails to provide for the particular coupling analogous to the present invention and, in effect, provides for a flip-chip package integrating optical and electrical devices and coupling to a waveguide on a circuit board in a manner as described with regard to the current state of the art. In that instance, in the prior art, the structure is disclosed in regard to a waveguide, which is embedded within the circuit board, and does not provide for the advantages of the present arrangement and method.

With regard to European Patent Application No. 0 544 002 A1, this also discloses an image-forming device including a laser beam scanner and does not direct itself to the interconnecting or mapping of a two-dimensional OE device array to a one-dimensional waveguide array.

Finally, with regard to P. Schnitzer, et al., "High Performance VCSEL Arrays for Optical Interconnection", 1998 *Electronic Components and Technology Conference*, Pages 762-770; 25-28 May 1998, this reference also does not disclose the particular interconnection and mapping of a two-dimensional OE device array to a one-dimensional waveguide array, and requires optical waveguides to be routed around sharp ends resulting in substantial losses, which renders the construction to be essentially impractical in use.

SUMMARY OF THE INVENTION

Accordingly, pursuant to the present invention, there is proposed a unique waveguide and OE array configuration for an OE device, wherein it is possible to expediently correlate the interconnection or mapping of a two-dimensional semiconductor OE device array to a one-dimensional waveguide array.

In that connection, it is possible to dimensionally and operatively improve upon a rectangular OE array on OE devices with linear waveguide channels through an orientation of waveguide channels, whereby the waveguides extend linearly from the OE devices, but at a fixed angle relative to an OE 2D grid, and thereby enable the provision of an arbitrarily large angle at which waveguide losses are minimized while maintaining a compactly sized OE module.

Furthermore, a further aspect of the present invention resides in providing an OE device array in a rhomboidal pattern, which facilitates waveguide channels to extend in paths linearly from the OE device array in the absence of any sharp bends, whereby the OE device drivers are typically laid out in a rectangular manner.

Pursuant to another aspect of the invention, there is provided a rhomboidal pattern for the OE devices while maintaining a rectangular two-dimensional array for electrical pads, so as to interface within silicon circuitry in a unique manner, thereby resulting in minimized optical losses for the OE devices.

Accordingly, it is an object of the present invention to provide a method of interconnecting or mapping a two-dimensional optoelectronic device array to a one-dimensional waveguide array, which will provide minimal losses of light and provide superior performance with regard to density in connections, reducing power dissipation and manufacturing expenditures.

Another object of the present invention is to provide an arrangement for the interconnection or mapping of two-dimensional OE device arrays to a one-dimensional waveguide array utilizing the unique inventive method.

BRIEF DESCRIPTION OF THE DRAWINGS

Reference may now be made to the following detailed description of preferred embodiments of the invention, taken in conjunction with the accompanying drawings; in which.

DETAILED DESCRIPTION OF THE INVENTION

Figure 1:
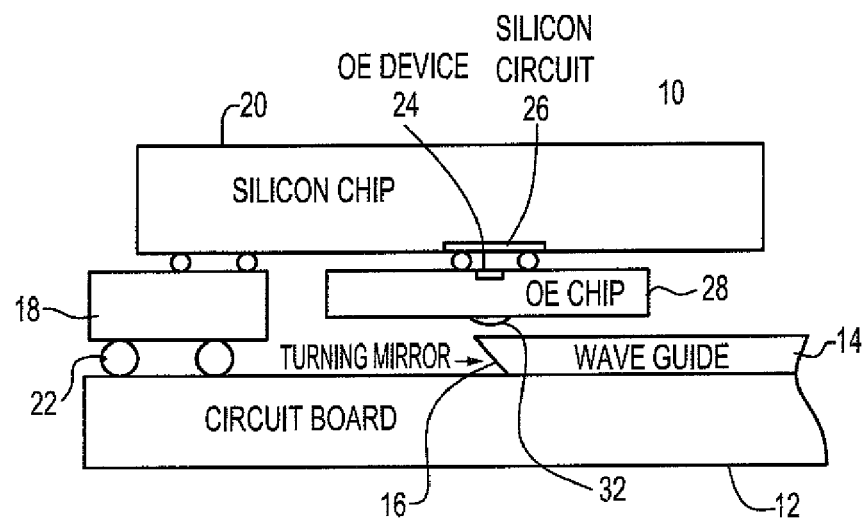
FIG. 1 illustrates a cross-sectional view of the interconnection between an optoelectronic device array and a waveguide array.

Referring in more specific detail to the drawings, illustrated in FIG. 1 of the drawings is a parallel optical module 10, which includes a circuit board 12 having a waveguide 14 arranged thereon including a turning mirror 16, and with a carrier 18 interposed between the circuit board 12 and a silicon chin 20 through the intermediary of a suitable ball grid array 22. An optoelectronic (OF) device 24 is connected to the lower surface of the silicon chip 20, the latter of which has a silicon circuit 26 facing the OE device, and which device is arranged in an OE substrate chip 28. Herein, the OE device 24 operates at a wavelength where the OE substrate chip 28 is transparent in nature, and whereby the resultant optical beam is emitted or detected through the OE substrate. The emitted light can be readily coupled to polymer-based waveguides, which are easily routed across the circuit board 12 to other optical modules (not shown). Alternatively, the waveguide 14 can be embedded within the circuit board, although, in this embodiment, it is shown as being positioned on the circuit board. The light emitted from the OE device is focused by a lens 32, which is reflected by turning mirror 16 and coupled into the core of the waveguide 14.

Figure 2:
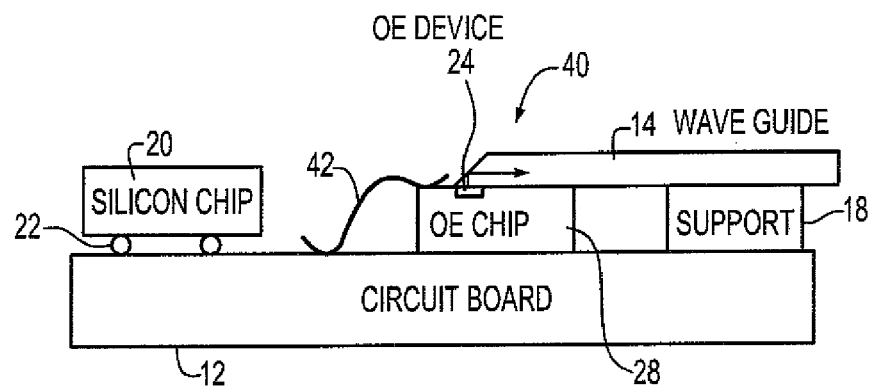
FIG. 2 illustrates a cross-sectional view of the interconnection between the optoelectronic device and the waveguide array in which electrical signals are transmitted from a circuit board through wirebonds to the optoelectronic device array.

As illustrated in the embodiment of the optical module 40 of FIG. 2 of the drawings, in which components similar to or identical with those in FIG. 1 are designated with the same reference numerals, the circuit board 12 has the OE chip positioned thereon with the OE device at the upper surface of the chip, which supports a waveguide, which also is supported on the circuit board.

A silicon chip 20 is positioned by means of a ball grid array 22 on the circuit board 12 and connected to the OE device 24 through the intermediary of wirebonds 42. The OE device 24 emits or detects light from the top surface, so that the waveguide 14 is mounted above the OE chip 28.

Figure 3:
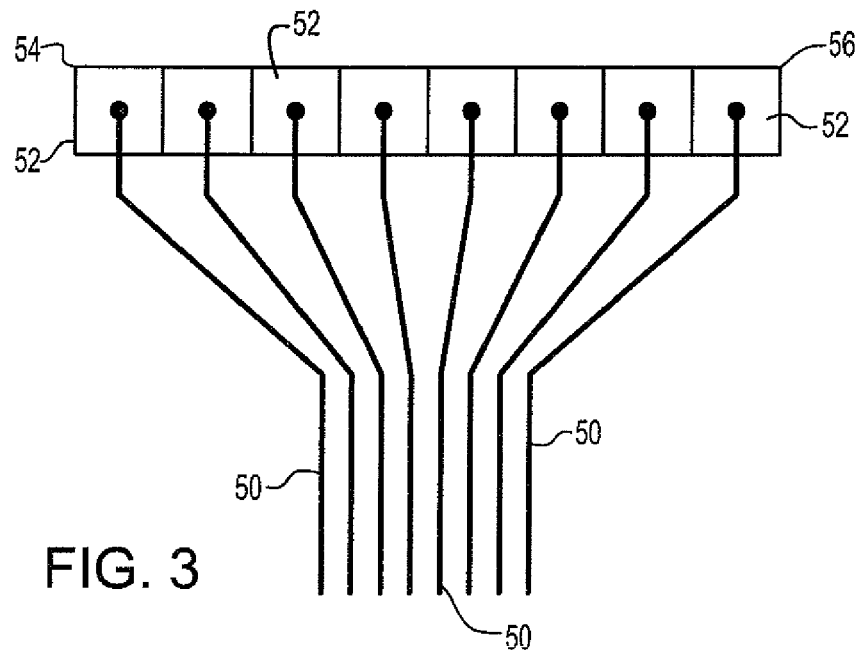
FIG. 3 illustrates an arrangement of the fanning out of an array of closely spaced waveguide channels in order to match the pitch of a larger more widely spaced OE device array.

As illustrated in FIG. 3, there is described an array of waveguide channels 50 wherein optical modules 52 are arranged in a linear one-dimensional array, and the linear one-dimensional waveguide channels 50 fan out to each of the optical modules 52. However, inasmuch as the waveguides are lithographically defined, although the linear channel density can be very high, such as, for example, at about a 62.5 µm pitch, it is impractical to lay out the channels 50 in the optical module on this pitch. This is due to the space which is required to implement the OE devices and silicon circuitry in the linear pattern, whereby a practical pitch for these channels is currently approximately 250 μm. Hereby, as the waveguides are fanned out to the module pitch, as shown in FIG. 3 of the drawings, as the number of optical channels increases, this approach provides limitations and drawbacks, since the optical alignment between the modules and the waveguides becomes difficult due to excessive run out, and in addition, the timing skew between the channels 50 at the outer edges 54, 56 of the array of the optical modules 52 and those in or near the center of the module array become extremely large.

Figure 4:
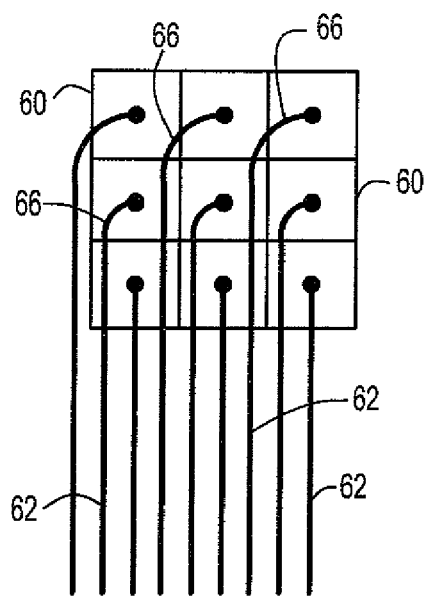
FIG. 4 illustrates an arrangement between closely spaced waveguide arrays and a rectangular 2D OE device array.

In the modified embodiment of FIG. 4 of the drawings, the OE devices 60 are arranged in a rectangular two-dimensional array, nine (9) devices 60 being shown in this particular embodiment by way of example, and linear one-dimensional waveguide channels 62 extend thereto in a close parallel relationship. Although this provides a more compact optical module 64 and an easier optical alignment between the waveguide and the channels, and a reduced or smaller timing skew between the channels, nevertheless, the optical waveguides must each be routed around relatively sharp bends 66. Inasmuch as most polymer waveguides incur substantial losses for bend radii which are less than 5 mm in size, this is rather cumbersome in construction in view of the tight channel turn which is required within the physical confines of the two-dimensional array of the OE devices 60.

Figure 5:
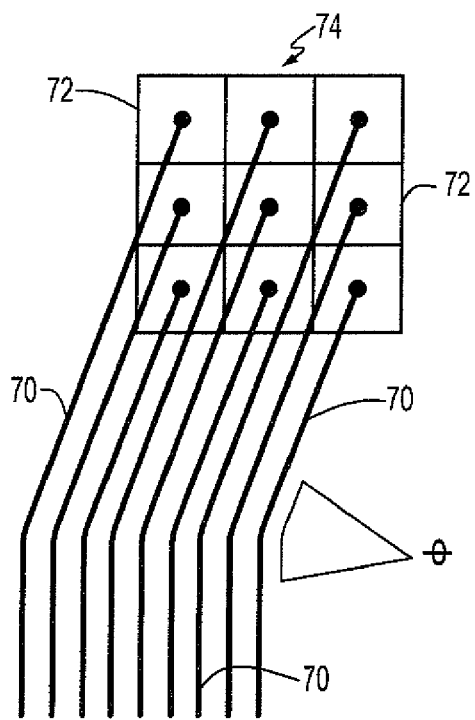
FIG. 5 illustrates a linear escarpment of waveguide channels from a rectangular two-dimensional OE device array at a fixed angle of the waveguide channels relative to the OE device array grid.

Referring to FIG. 5 of the drawings, which provides a further improved modification pursuant to the present invention, this discloses a solution to the previously discussed problem in that the waveguides 70 extend linearly from the rectangularly arranged OE devices 72, but at a fixed angle compared to the two-dimensional grid, represented by the devices. Once the waveguides 70 extend outwardly from the OE array, the traces or paths thereof can be routed across the circuit board (not shown) at an arbitrary angle θ and this then minimizes the waveguide losses while maintaining a compact OE module 74.

Hereby, the waveguide escapement or outward displacement angle (as extending over the OE array) is determined by the number of rows in the OE array and the pitch between OE array elements pursuant to the following relationship:

$$\tan\theta = \frac{OE\_ArrayPitch}{Rows \times OE\_ArrayPitch}$$

By way of example, a four row OE array with an array pitch of 250 microns requires an angle (θ) of 14 degrees. The maximum number of OE array rows is limited by the pitch between OE elements, the waveguide core width and the minimum separation between waveguide cores. After the waveguides 70 leave the region of the OE array, they may be rerouted across the board at an arbitrary suitable angle.

Figure 6:
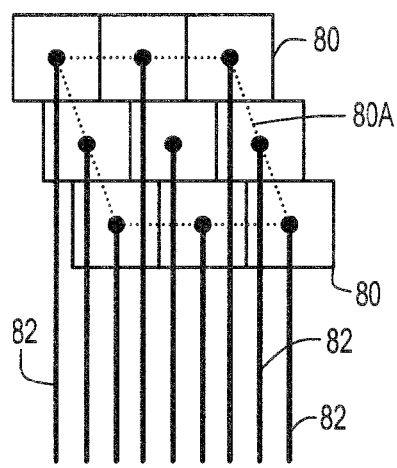
FIG. 6 illustrates a layout of OE device channels in a rhomboidal two-dimensional array.

Alternatively, in another version of the invention, as illustrated in FIG. 6 of the drawings, it would also be practical that the OE devices 80 are laid out in a two-dimensional rhomboidal array in lieu of the rectangular array of FIG. 5. This rhomboidal two-dimensional device array, facilitating a close parallel spacing between the waveguide channels 82, also minimizes optical losses and any potential crosstalk, while only slightly increasing the overall size, as compared to the rectangular device arrangement of FIG. 5. Concerning the foregoing, this embodiment represents a relatively straightforward layout of the OF devices 80 on a rhomboidal grid 80A, this being easily implemented inasmuch as these devices are generally simple two-dimensional diodes. However, this arrangement is somewhat more difficult to effectuate in connection with silicon circuitry since it increases layout complexity, and in particular, the routing of all of the bias and signal lines from the chip edges to the interior waveguide channels becomes relatively more complex, as compared to a rectangular array design.

Figure 7:
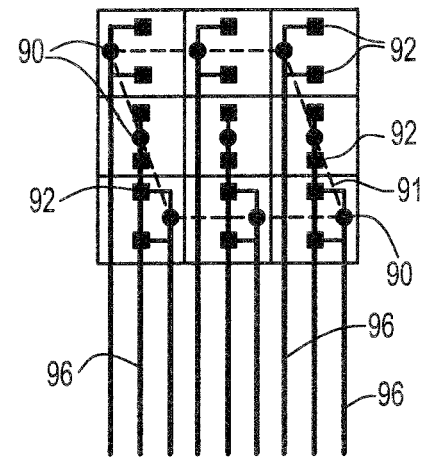
FIG. 7 illustrates a layout which connects pads of a rectangular silicon circuit array to a rhomboidally arranged OE device array.

It is possible to convert from a rhomboidal OE device array 91 (as shown by the dash lines) to a rectangular circuit array by arranging the OE electrical pads 92, as illustrated in FIG. 7 of the drawings. In that instance, the pads 92 maintain the rectangular grid, while the active OE devices 90 are offset to interface with the waveguides 96. Thus, as arranged in FIG. 7 of the drawings, the electrical path between each of the OE devices 90 and the pads 92 possess different path lengths and parasitics, for example, such as capacitance, inductance and the like. However, these differences can be readily minimized by modifying the electrical routing on the OE wafer 94, such that the electrical path lengths are the same, while the waveguide channels 96 are always in a linear parallel relationship with each other.

Figure 8:
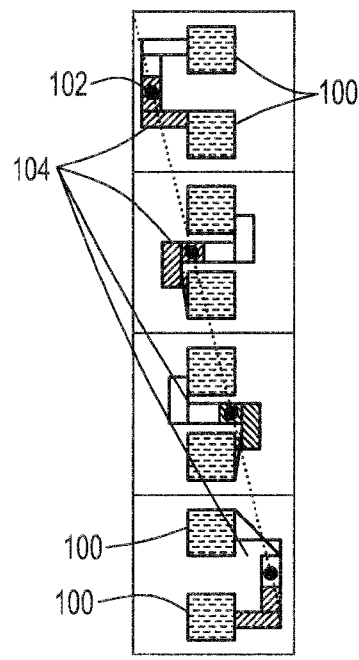
FIG. 8 illustrates a layout presenting a connection of pads of a rectangular silicon circuit array to a rhomboidal OE device array.
Figure 9:
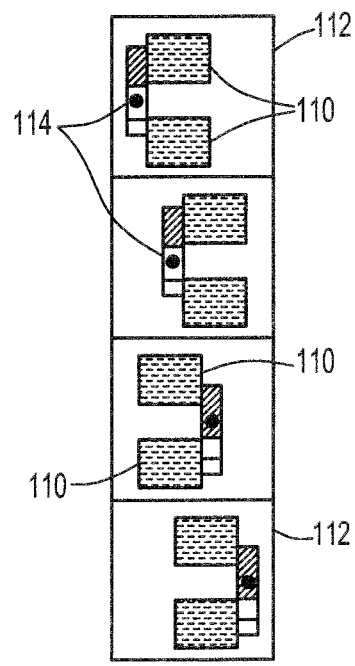
FIG. 9 illustrates a layout which connects pads of a rectangular silicon circuit array to a rhomboidal OE device array.

This is illustrated in FIG. 8 of the drawings for a four-channel implementation. The pads 100 are shown connected to the waveguides 102 and the OE devices 104 in a manner which minimizes the differences in inductances. However, pursuant to a further improvement, as illustrated in FIG. 9 of the drawings, the differences in inductance can be further minimized between the different layouts by employing larger sized pads 110 and arranging them in a symmetrical manner. Consequently, inasmuch as the pads 110 are the same size, the parasitic capacitance will be identical for all devices 112. In that instance, the electrical paths for interface to silicon circuitry maintain a rectangular two-dimensional array. The OE devices 114 are arranged on a rhomboidal two-dimensional array in that instance.

Figure 10:
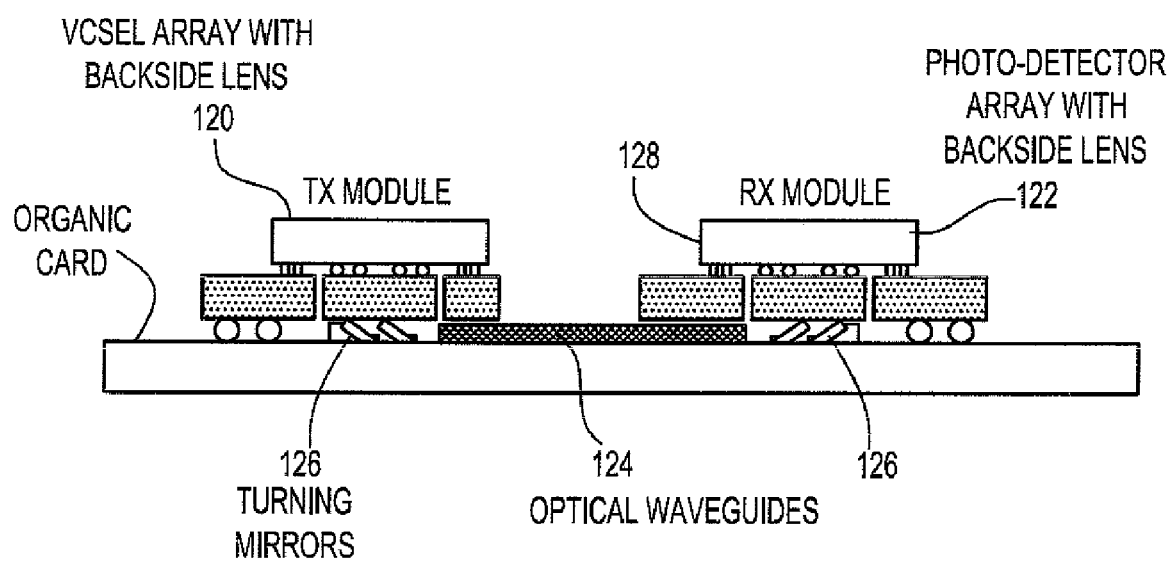
FIG. 10 illustrates a system layout for interconnecting a two-dimensional OE device array to a one-dimensional waveguide array in order to functionally implement an optical link.

As illustrated in FIG. 10 of the drawings, the foregoing concepts and arrangements of interconnecting a two-dimensional OE device array to a one-dimensional waveguide array may be employed in order to implement the construction of a functional optical link. In that instance, electrical signals are converted into light by the OE VCSEL array 120 and then focused by means of integrated lenses 122 into an array of optical waveguides 124. Thereafter, light from these waveguides 124 is redirected out of plane by means of turning mirrors 126 towards an OE photodiode array 128, where the optical signals are converted into electrical signals. This is a practical application of the inventive method and arrangements for the interconnecting or mapping of a two-dimensional OE device to a one-dimensional waveguide array in a manner which is not at all disclosed nor suggested in the prior art.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. An arrangement for interconnecting optoelectronic devices to waveguides; said arrangement comprising:
   a plurality of said optoelectronic devices being arranged to form an optoelectronic module, said optoelectronic module having said optoelectronic devices arranged in a two-dimensional array; and
   a plurality of said waveguides being connected to said optoelectronic devices in a one-dimensional array of said waveguides, said waveguides being in a one-to-one relationship with said optoelectronic devices;
wherein said array of waveguides extend from a two-dimensional grid represented by said optoelectronic devices, and said array of waveguides extending along paths routed to a circuit board; and
wherein a maximum number of optoelectronic device array rows are defined by the pitch between elements on said optoelectronic devices, waveguide core widths, and minimum separation between waveguide cores.

2. An arrangement as claimed in claim 1, wherein said module comprises said plurality of optoelectronic devices being arranged in a rectangular array, and said array of waveguides extending from said optoelectronic devices in substantially linear orientations.

3. An arrangement as claimed in claim 2, wherein said waveguides extend from said optoelectronic devices at mutually parallel spacings.

4. An arrangement as claimed in claim 3, wherein said array of waveguides extends linearly at an arbitrarily selected angle relative to the configuration of said rectangular array of optoelectronic devices, said substantially linear parallel orientations of said waveguides being at a fixed angle compared to said two-dimensional grid represented by said optoelectronic devices and extending along said paths routed to said circuit board at an arbitrary angle for minimizing waveguide losses.

5. An arrangement as claimed in claim 2, wherein said array of waveguides extends linearly at an orientation coaxially with the edges of said rectangular array of optoelectronic devices.

6. An arrangement as claimed in claim 2, wherein said module comprises nine of said optoelectronic devices in a square array of said optoelectronic devices.

7. An arrangement as claimed in claim 1, wherein said module comprises said plurality of optoelectronic devices being arranged in a rhomboidal array.

8. An arrangement as claimed in claim 7, wherein said waveguides extend from said rhomboidally arranged optoelectronic devices in an orthogonal orientation relative to said optoelectronic devices.

9. An arrangement as claimed in claim 8, wherein said waveguides extend linearly in parallel spaced relationship with each other.

10. An arrangement as claimed in claim 2, wherein each said optoelectronic device includes electrically-conductive pad forming electrical connections interfacing with silicon circuitry, said waveguides being operatively connected to said electrically-conductive pads.

11. An arrangement as claimed in claim 10, wherein electrical paths on each of said optoelectronic devices communicating said pads with said waveguides are of equal length, and said waveguides are arranged in channels in linear parallel spaced relationships with each other.

12. An arrangement as claimed in claim 7, wherein electrically-conductive pads forming electrical connections interfacing with silicon circuitry are located on each of said rhomboidally arranged optoelectronic devices, said pads being dimensioned of equal sizes and arranged symmetrically in a rectangular array so as to produce identical minimal parasitic capacitances for all of said optoelectronic devices.

13. An arrangement as claimed in claim 12, wherein said electrically-conductive pads are maintained in a rectangular array concurrently with said optoelectronic devices being formed in a rhomboidal array.

14. An arrangement as claimed in claim 1, wherein said optoelectronic module comprises a plurality of said optoelectronic devices in a square array of said optoelectronic devices.

15. An arrangement as claimed in claim 14, wherein said optoelectronic devices comprise a VCSEL array for converting electrical signals into light, and integrated optical lenses focusing the light into an array of optical waveguides.

16. An arrangement as claimed in claim 15, wherein at least one turning mirror directs light emanating from said waveguides to an optoelectronic photodiode array for converting optical signals into electrical signals.

17. A method of interconnecting or mapping optoelectronic devices to waveguides; said method comprising:
arranging a plurality of said optoelectronic devices to form an optoelectronic module, said optoelectronic module having said optoelectronic devices arranged in a two-dimensional array; and
connecting a plurality of said waveguides to said optoelectronic devices in a one-dimensional array of said waveguides, said waveguides being in a one-to-one relationship with said optoelectronic devices;
extending said array of waveguides from a two-dimensional grid represented by said optoelectronic devices and extending said array of wave ides along paths routed to a circuit board; and
defining a maximum number of optoelectronic device array rows by the pitch between elements on said optoelectronic devices, waveguide core widths, and minimum separation between waveguide cores.

18. A method as claimed in claim 17, wherein said module comprises arraying said plurality of optoelectronic devices in a rectangular array, and said array of waveguides extending from said optoelectronic devices in substantially linear orientations.

19. A method as claimed in claim 18, wherein said waveguides extend from said optoelectronic devices at mutually parallel spacings.

20. A method as claimed in claim 19, wherein said array of waveguides extends linearly at an arbitrarily selected angle relative to the configuration of said rectangular array of optoelectronic devices, said substantially linear parallel orientations of said waveguides being at a fixed angle compared to said two-dimensional grid represented by said optoelectronic devices and extending along said paths routed to said circuit board at an arbitrary angle for minimizing waveguide losses.

21. A method as claimed in claim 18, wherein said array of waveguides extends linearly at an orientation coaxially with the edges of said rectangular array of optoelectronic devices.

22. A method as claimed in claim 18, wherein said module comprises nine of said optoelectronic devices in a square array of said optoelectronic devices.

23. A method as claimed in claim 17, wherein said module comprises arranging said plurality of optoelectronic devices in a rhomboidal array.

24. A method as claimed in claim 23, wherein said waveguides extend from said rhomboidally arranged optoelectronic devices in an orthogonal orientation relative to said optoelectronic devices.

25. A method as claimed in claim 24, wherein said waveguides extend linearly in parallel spaced relationship with each other.

26. A method as claimed in claim 18, wherein each said optoelectronic device includes electrically-conductive pad forming electrical connections interfacing with silicon circuitry, said waveguides being operatively connected to said electrically-conductive pads.

27. A method as claimed in claim 26, wherein electrical paths on each of said optoelectronic devices communicating said pads with said waveguides are of equal length, and said waveguides are arranged in channels in linear parallel spaced relationships with each other.

28. A method as claimed in claim 23, wherein electrically-conductive pads forming electrical connections interfacing with silicon circuitry are located on each of said rhomboidally arranged optoelectronic devices, said pads being dimensioned of equal sizes and arranged symmetrically in a rectangular array so as to produce identical minimal parasitic capacitances for all of said optoelectronic devices.

29. A method as claimed in claim 28, wherein said electrically-conductive pads are maintained in a rectangular array concurrently with said optoelectronic devices being formed in a rhomboidal array.

30. A method as claimed in claim 17, wherein said optoelectronic module comprises a plurality of said optoelectronic devices in a square array of said optoelectronic devices.

31. A method as claimed in claim 30, wherein said optoelectronic devices comprise a VCSEL array for converting electrical signals into light, and integrated optical lenses focusing the light into an array of optical waveguides.

32. A method as claimed in claim 31, wherein at least one turning mirror directs light emanating from said waveguides to an optoelectronic photodiode array for converting optical signals into electrical signals.

\* \* \* \* \*